Jan. 5, 1932.  F. C. HASSE  1,840,195
BLOWPIPE
Filed Sept. 22, 1928  2 Sheets-Sheet 2
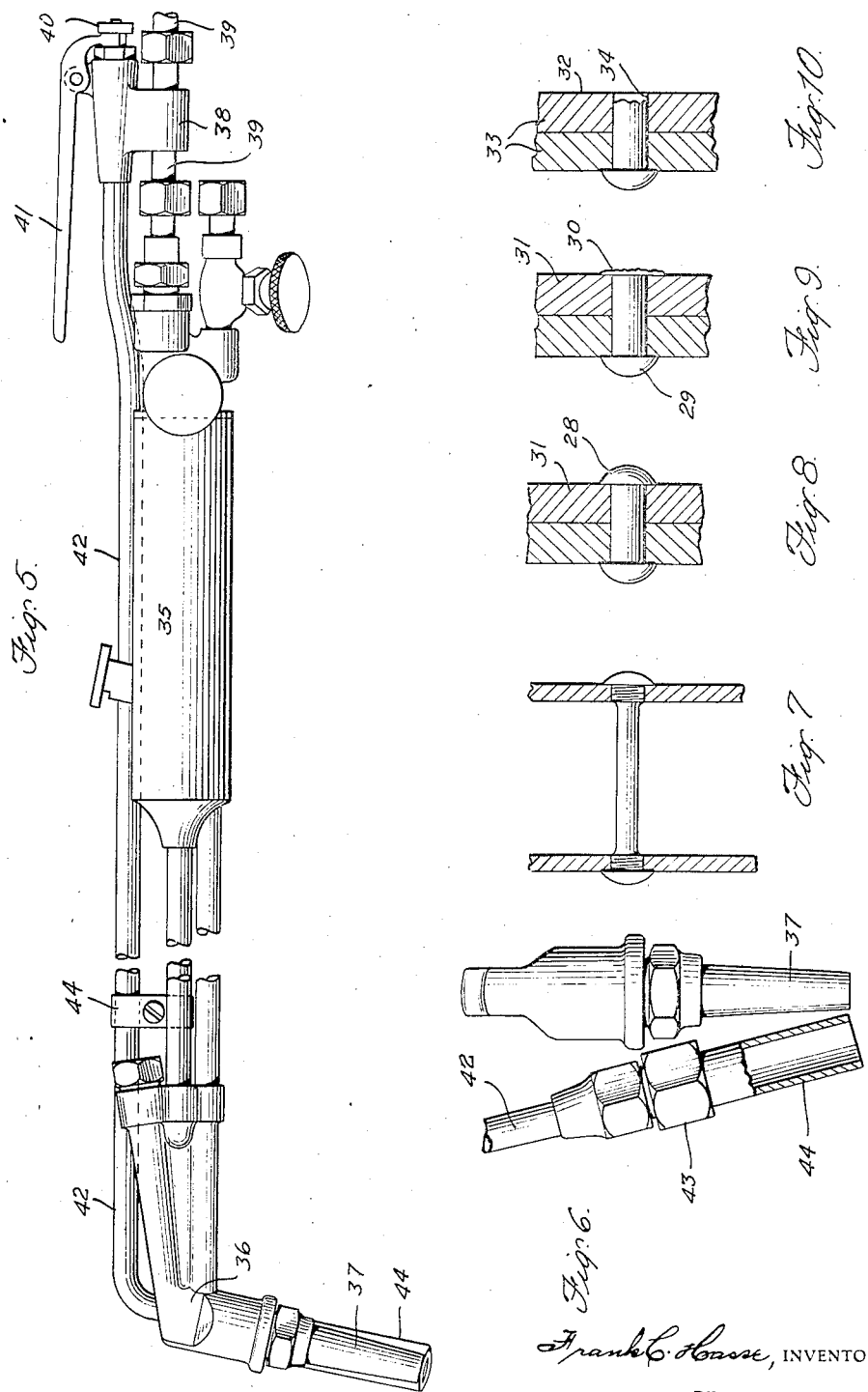
Frank C. Hasse, INVENTOR,
BY
Byrnes Townsend & Brickenstein, ATTORNEYS.

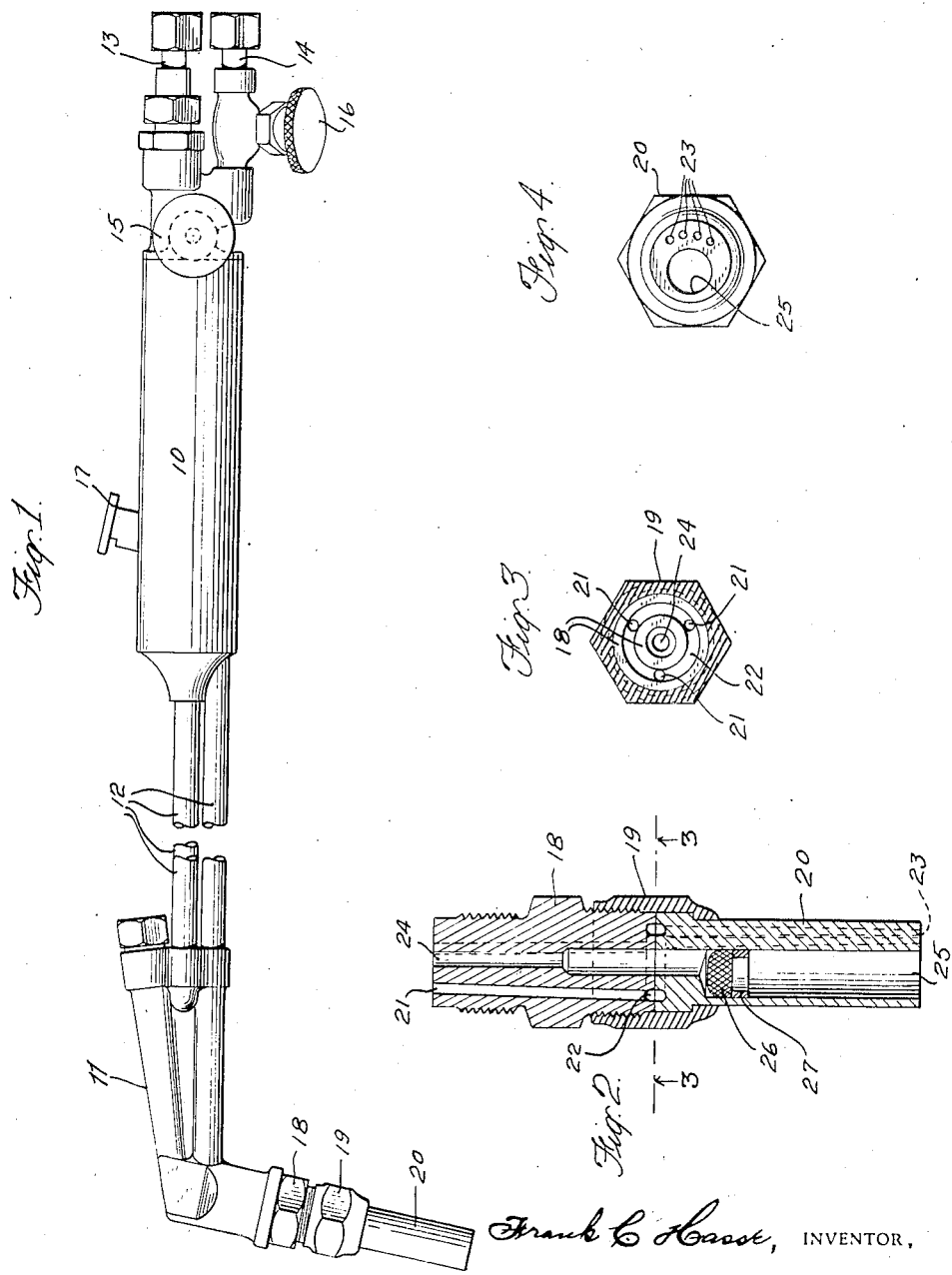

Patented Jan. 5, 1932

1,840,195

UNITED STATES PATENT OFFICE

FRANK C. HASSE, OF LA GRANGE, ILLINOIS, ASSIGNOR TO UNION CARBIDE & CARBON RESEARCH LABORATORIES, INC., A CORPORATION OF NEW YORK

BLOWPIPE

Application filed September 22, 1928. Serial No. 307,720.

This invention relates to blowpipes and more specifically to a form especially adapted for removing rivet heads and the like from fabricated steel.

Heretofore, the method of removing heads from rivets in fabricated steel by the use of a metal cutting blowpipe has been to cut through the rivet head approximately parallel to and as near the surface of the steel as possible. This method is objectionable for several reasons. If the cut is not made close enough to the steel then only a portion of the rivet head is cut off and removal of the rivet is retarded with subsequent increase in cost; on the contrary, if the cut is made too close to the steel it will be injured by the action of the cutting flame. This undesirable condition is more pronounced when a metal cutting blowpipe is used for removing staybolts from locomotive boilers where, in addition to cutting off the riveted portion of the staybolt, each of the threaded ends must be cut completely out of the boiler plate. In performing this operation a portion of the staybolt is usually left in the plate, or the hole in the plate is so mutilated that it must be considerably enlarged, or new sheets applied. Furthermore, this method is expensive, difficult to use in confined places, and under some conditions, such as in freight cars, requires the removal of dirt or foreign substances from around the rivets.

Therefore, one of the objects of this invention is to provide a blowpipe that will quickly remove the heads from rivets in fabricated steel without injuring or mutilating the surface of the steel or the edge of the rivet holes, and to remove staybolts or other means or fastenings that are or may be used for fabricating purposes. Other objects are a blowpipe that is easy to operate and is applicable for use in confined places. Other aims and objects will be apparent from the specification and drawings.

I attain these objects by the mechanism illustrated in the accompanying drawings in which:

Fig. 1 is a side view of a blowpipe embodying my invention;

Fig. 2 is a longitudinal section of the nozzle and adapter of the blowpipe shown in Fig. 1;

Fig. 3 is a transverse section along the line 3—3 of Fig. 2;

Fig. 4 is a view of the outer end of the blowpipe nozzle shown in Figs. 1 and 2;

Fig. 5 is a side view of an alternative blowpipe embodying my invention;

Fig. 6 is a view showing the relative position of the two nozzles of the blowpipe shown in Fig. 5, with one partially in section;

Fig. 7 is a section of a locomotive firebox with a staybolt therein such as this blowpipe is especially adapted for removing;

Fig. 8 is a section of fabricated steel with a rivet therein such as this blowpipe is especially adapted for removing;

Fig. 9 shows the rivet of Fig. 8 with one head removed with an ordinary metal cutting blowpipe; and, Fig. 10 shows the rivet of Fig. 8 with one head removed with my improved blowpipe.

In the embodiment of the invention shown in Fig. 1, the blowpipe may comprise a body 10 and a head 11 joined by three gas conducting pipes 12. At the rear of the body 10 there is a nipple 13 adapted for coupling to a suitable source of oxygen supply, such as a tank of compressed oxygen, by an appropriate length of flexible hose, and a nipple 14 adapted for coupling to a suitable source of fuel gas supply, such as a tank of acetylene gas, by another appropriate length of flexible hose. Suitable conduits within the blowpipe conduct the oxygen and acetylene to the head 11 where it is combined to form a combustion supporting mixture. The amount of oxygen in the mixture may be controlled by the manually operable valve 15, and the amount of acetylene in the mixture may be controlled by the manually operable valve 16. A knob 17 controls the position of another valve that permits a stream of auxiliary oxygen to flow through the blowpipe body 10 and head 11 in a conduit that is independent of those supplying gas to the combustion supporting mixture. So far the structure and arrangement of the blowpipe follows that of a style well known in the art.

Attached to the outer end of the head 11, in place of the usual tip, is an adapter 18, and attached to the adapter 18 by means of a gland nut 19 is a blowpipe nozzle 20. Extending longitudinally through the exterior portion of the adapter 18 are three spaced openings 21 communicating with an annular distributing chamber 22 formed by annular grooves in the adjoining ends of the adapter 18 and the nozzle 20. Extending longitudinally through the nozzle 20, from the distributing chamber 22 to the outer end, is a group of spaced openings 23. Extending longitudinally through the center of the adapter 18 and the rear end of the nozzle 20 is an opening 24 connecting with an enlarged eccentric opening 25 extending the rest of the way through the nozzle 20. In the rear end of the eccentric opening 25, where it joins the central opening 24, is a transversely extending turbulence reducing screen 26 that is made cup shaped so it may be inserted more easily and held in place more securely. The screen 26 may be replaced by a network of wires, a perforated plate, a series of baffles, a tuft of steel wool, or other means for reducing the turbulence in the gas passing therethrough. Located over the screen 26 and holding it in position in the bottom of the opening 25 is a frictionally retained ferrule 27.

By the use of the turbulence reducing screen 26 in the opening 25 greater economy of oxygen is effected as the loss of oxygen by dissipation is almost entirely eliminated. Also, rivet heads may be removed in a more rapid, uniform, and satisfactory manner as any turbulence in the oxygen stream appears to have a detrimental effect.

The outer surface of the nozzle 20 and the surface of the opening 25 in the nozzle 20 are covered with a protective coating of chromium which may be applied by the process of electroplating. I have found that by chromium plating the nozzle 20 it will last longer and that rivet heads may be removed more rapidly without injuring it.

When the blowpipe is in operation the combustion supporting mixture formed within the blowpipe passes out through the openings 21, in the adapter 18, distributing chamber 22, and openings 23 in the nozzle 20, where it burns forming the preheating flame. The auxiliary oxygen flows outward through the openings 24 and 25 in the adapter 18 and nozzle 20, respectively. The method of operating the rivet removing blowpipe is similar to that of operating the ordinary metal cutting blowpipe. The valves 15 and 16 are opened and the combustible mixture issuing from the openings 23 in the outer end of the nozzle 20 is ignited, and then the valves are adjusted so the usual heating flame is formed. When oxygen and acetylene are used to form the heating flame the oxygen pressure at the blowpipe should be less than that usually used with a metal cutting blowpipe. The best results have been attained with an oxygen pressure at the blowpipe of approximately twenty-five pounds to the square inch. As the volume of the auxiliary oxygen passing through the blowpipe is controlled largely by the pressure of the oxygen at the blowpipe, it may be desirable to vary the pressure somewhat for different classes of work. When the pressure is too low the speed of the operation is unnecessarily slow, and when the pressure is too high oxygen may be wasted and some of the desirable characteristics of the operation of the blowpipe may be impaired or lost.

When the blowpipe described herein is used for removing the heads from rivets, such as shown in Fig. 8, and staybolts, such as shown in Fig. 7, the results obtained are very much different and superior to those obtained when an ordinary metal cutting blowpipe is used. This is because the rivet removing blowpipe has an oxygen jet with a characteristic quite different from that of a metal cutting blowpipe.

When a metal cutting blowpipe is used for removing a rivet head, such as that shown at 28 in Fig. 9, the blowpipe is held so the heating flame is as nearly parallel to the surface 31 as it is possible to get it. The blowpipe is then moved toward the rivet until the edge of the rivet head is in the heating flame and the blowpipe is held in this position until the rivet head is heated to a point where it will sustain combustion in an atmosphere rich in oxygen. Then the auxiliary oxygen valve is opened and a fine stream of high velocity cutting oxygen is directed upon the heated portion of the rivet. This stream of oxygen burns or oxidizes the portion of the rivet head in its path and also blows the oxide or slag away from the heated area. As fast as the metal is burned and blown away the blowpipe is slowly moved in a direction parallel to the surface 31 so the head of the rivet is cut off as close to this surface as possible. Usually a portion 30 of the rivet head 28 is left attached to the body of the rivet because the flame will cut into the surface 31 and injure it when the cut in the rivet is made too close to the surface.

When my improved blowpipe is used for removing a rivet head the blowpipe is held so the flame is substantially parallel to and in alignment with the body or axis of the rivet and the flame is directed upon the center of the rivet head and held there until the head has been heated to a point where it will sustain combustion in the presence of atmosphere rich in oxygen. Then the knob 17 is depressed thereby opening the auxiliary oxygen conduit, permitting a stream of non-turbulent low velocity oxygen to emerge from the opening 25 in the nozzle 20 and envelop the rivet head. The velocity of the oxygen stream is so low that the slag is not blown away from the heated area and, therefore, the oxygen does not burn a hole into the rivet as a high velocity jet from a cutting blowpipe would but, instead, the entire rivet head and part of the body are rapidly burned or oxidized so the slag runs away leaving the surface 32 of the fabricated steel 33, and the edge 34 of the rivet hole entirely uninjured as shown in Fig. 10. The oxygen stream is not only of such low velocity that it does not blow the slag away from the heated area, but it is of such low velocity that it does not even break through the protecting or insulating film of oxide that forms on the surface of the fabricated steel in the rivet hole and under the rivet head.

During the process of removing a rivet head with my improved blowpipe there are several features that distinguish it from the process of removing a rivet head with a metal cutting blowpipe. With my blowpipe the preheating flame is directed upon the center of the rivet head from a direction at right angles to the surface of the fabricated steel, while with a metal cutting blowpipe it is directed upon the edge of the rivet head from a direction parallel to the surface of the fabricated steel. With a metal cutting blowpipe, after the rivet head has been preheated and the auxiliary oxygen has been turned on, the oxygen burns only that portion of the rivet head that is in its path and it blows the slag out of its path so it progressively cuts through the rivet head in the direction in which the oxygen jet is moved. Therefore, the action of this blowpipe in cutting through a rivet head is like that of a needle flame cutting through a wax candle. With my blowpipe, when the rivet head has been preheated and the auxiliary oxygen has been turned on the oxygen envelopes the entire head which is quickly and entirely burned. As the velocity of the oxygen is not great enough to blow the slag away it, consequently, runs away like the melted wax from the end of a candle held in a Bunsen flame. The high velocity oxygen jet of a metal cutting blowpipe will cut into the surface of fabricated steel just as easily as it will into the head of a rivet, so considerable care must be exercised when cutting a rivet head to not direct the jet upon the fabricated steel or it will be injured. With the low velocity jet of my blowpipe the fabricated steel is not injured while the rivet head is being removed. While the entire rivet head and part of the body is burned by the oxygen the temperature of the fabricated steel is not raised to even a red heat but remains dark in color while the rivet head is burned and the slag runs away. This very desirable feature appears to be due to the fact that the velocity of the oxygen is not high enough to blow the slag away and thereby or otherwise break through the protecting coating of oxide on the surface of the fabricated steel and ignite the metal underneath.

This invention occupies that portion of the field of the oxy-gas welding and cutting art lying between the metal cutting blowpipe on the one hand and the auxiliary oxygen welding blowpipe on the other. A blowpipe embodying this invention is distinguished from a metal cutting blowpipe by its faculty of producing an oxidizing flame or an oxygen jet and a flame having a velocity insufficient to blow the oxide or slag out of its path or away from the heated area. On the other hand, a blowpipe embodying this invention is distinguished from welding blowpipes including those using auxiliary oxygen, by its faculty of producing a highly oxidizing flame. The reason for the results obtained by the distinguishing features of a blowpipe embodying this invention is outstanding when the character of its oxygen jet is compared with those of metal cutting blowpipes on the one hand and with those of welding blowpipes employing auxiliary oxygen on the other hand. The velocity of the oxygen jet in metal cutting blowpipes is approximately 2,000 feet a second. It is the oxygen at this high velocity that blows the slag away from the heated area. The velocity of the oxygen jet of my improved blowpipe is approximately 92 feet a second. At this low velocity the oxygen does not blow the slag away from the heated area. The velocity of the auxiliary oxygen jet in a welding blowpipe is approximately 75 feet a second. But in this blowpipe an auxiliary oxygen valve is provided so the volume of oxygen may be reduced to a degree where the welding flame is not oxidizing.

A modified form of a blowpipe embodying my invention may be constructed by adding a low velocity oxygen nozzle to a well known blowpipe as shown in Figs. 5 and 6. In this embodiment of the invention the blowpipe body 35, head 36, and tip 37, are employed only for the purpose of producing a heating flame. A valve casting 38 is coupled into the oxygen line 39 at the rear of the blowpipe body 35. Oxygen may freely pass through this casting 38 to the blowpipe. Within the valve casting 38 is a valve that is controlled by a valve stem 40, which in turn is manually operable by a valve handle 41 to permit oxygen to flow from the oxygen supply line 39 through the valve body 38 and a tube or conductor 42 to the low velocity oxygen nozzle 43. A clamp 44 may be employed to support the tube 42 so the oxygen nozzle 43 lies close to the side of the tip 37. The nozzle 43 has a large opening or orifice 45 in the outer end for the purpose of emitting a low velocity non-turbulent jet or stream of oxygen the same or similar to that emitted from the opening 25 in the nozzle 20 of the blowpipe shown in Figs. 1 to 4. Although the oxygen nozzle 43 and the preheating flame tip 37 are separate in this blowpipe it may be operated in the same manner as the blowpipe shown in Fig. 1 having a single nozzle.

The arrangement and size of the openings in the nozzles shown in the drawings may be varied to meet the requirements of various working conditions. As an example, the openings 23 may be varied in size and number, and they may be arranged in various patterns symmetrical and otherwise around the oxygen opening 25. I have found it advisable, however, to arrange the flame openings 23 in as small a group as structurally convenient to conserve the heat of the flame formed by the combustion of gas emerging therefrom. As the distance between the openings 23 is increased, or the size of the group is increased, the temperature of the nozzle 20 is increased and the effective temperature of the flame is decreased. Therefore, the less the distance between the openings 23, and/or the smaller the group, the greater the effective temperature of the flame, which is the end desired.

The number, variety, and nature of the metals, metallic compositions, and alloys, that may be operated upon by the use of the blowpipes described herein is believed to be the same as those that may be operated upon by the use of metal cutting blowpipes already known in the art.

The term fabricated steel as used herein is intended to cover all forms of iron or steel articles that are attached together with rivets, bolts, or similar fastening devices and, also, metal articles having rivets, bolts, studs, screws, and similar devices in or attached to them for other purposes.

Bolts, machine screws, staybolts, cap screws, lag screws, studs, and similar articles are considered the equivalent of rivets and all of them may be operated upon by the use of my improved blowpipe. Furthermore, they may be operated upon when in metals other than iron or steel, and when in materials other than metals.

The improved blowpipe described herein is not limited to the use of acetylene as a fuel gas but may be used with any fuel gas used in other blowpipes, welding torches, cutting torches, and similar devices.

The construction of the blowpipes shown and described herein may be altered or improved in various ways such as by eliminating the adapter 18 between the blowpipe head 11 and the nozzle 20 and constructing the parts so the nozzle 20 may be attached directly to the head 11. The adapter 18 is used to attach the nozzle 20 to the head 11 of a blowpipe that may be used for other purposes and with other nozzles, and either or both the head 11 and the nozzles 20 may be altered so the nozzle may be attached directly to the head without altering the invention or its method of operation. These and other alterations and adaptations may be made without departing from the spirit of the invention or sacrificing any of the rights thereunder.

I claim:

1. Process of removing heads from rivets in fabricated steel comprising; preheating a rivet head and then directing a stream of oxygen thereon having a volume sufficient to oxidize said head and a velocity insufficient to blow the slag away from the heated area.

2. Process of removing heads from rivets in fabricated steel comprising; preheating a rivet head with an oxy-gas flame and then adding a stream of oxygen to said flame having a volume sufficient to oxidize the rivet head and a velocity insufficient to blow the slag away from the heated area.

3. Process of removing heads from rivets in fabricated steel comprising; preheating at least a portion of a rivet head with an oxy-acetylene flame and then adding a stream of oxygen to the flame having a volume sufficient to oxidize the rivet head and a velocity insufficient to blow the slag away from the heated area.

4. Process of removing heads from rivets in fabricated steel comprising; preheating at least a portion of a rivet head with an oxy-gas flame and then adding oxygen to the flame so it is highly oxidizing and quickly oxidizes the rivet head and yet has insufficient velocity to break through the protecting coating of oxide on the surface of the fabricated steel, so the fabricated steel around the rivet is uninjured.

5. Process of removing heads from rivets in fabricated steel comprising; preheating at least a portion of a rivet head with an oxy-acetylene flame and then adding oxygen to the flame so it is highly oxidizing and quickly oxidizes the rivet head and yet has insufficient velocity to break through the protecting coating of oxide on the surface of the fabricated steel so the fabricated steel around the rivet is uninjured.

6. The process of removing rivet heads comprising; heating a portion of said head to the temperature of rapid oxidation in a low velocity oxidizing gas stream, reducing an oxidizing stream of gas to such a velocity that it is insufficient to blow the slag when formed away from the head and directing the stream of gas in sufficient volume upon said head to oxidize said head.

7. The process of removing rivet heads comprising; preheating the head and then directing an oxidizing stream of gas thereon having a volume sufficient to oxidize said head and a velocity of about 92 feet per second.

8. The process of removing rivet heads comprising; heating a portion of the head to the temperature of oxidation in a low velocity oxygen stream, reducing the velocity and turbulence of an oxygen stream until the character of the gas stream is such that it will not blow slag away from the surface of the oxidized metal, and directing the stream of gas upon the head in sufficient volume to oxidize the metal of the head.

9. The process of removing rivet heads from rivets in fabricated steel comprising; heating a portion of said head to the temperature of rapid oxidation in a low velocity oxidizing gas stream and directing a stream of oxidizing gas upon said head in sufficient volume to oxidize said head and with insufficient velocity to break through the oxide coating on the surface of the fabricated steel.

10. The process of removing rivet heads from rivets in fabricated steel comprising; heating a portion of said head to the temperature of oxidation in a low velocity oxidizing gas stream and directing a non-turbulent oxidizing stream upon said head in sufficient volume to oxidize the metal of said head at the point of impingement of the gas stream and with insufficient velocity to break through the oxide coating on the surface of the fabricated steel.

11. The process of removing rivet heads comprising; heating a portion of the rivet head to the temperature of oxidation in a low velocity stream of oxidizing gas and directing a stream of oxidizing gas upon and substantially parallel to the axis of said rivet in sufficient volume to oxidize said head and with insufficient velocity to blow the slag away from the zone of reaction.

12. The process of removing rivet heads from a riveted steel structural member comprising; heating a portion of the head to the temperature of oxidation in a low velocity stream of oxidizing gas, and directing a stream of oxidizing gas upon and substantially parallel to the axis of the rivet in sufficient volume to oxidize the head and with insufficient velocity to break through the oxide coating on the structural member beneath the slag formed by the oxidizing gas.

In testimony whereof, I affix my signature.
FRANK C. HASSE.